March 26, 1968  C. J. BURCH  3,374,999
SLAG-GRANULATING APPARATUS
Filed Dec. 17, 1964  3 Sheets-Sheet 2

INVENTOR.
CHARLES J. BURCH
By Donald G. Dalton
Attorney

March 26, 1968     C. J. BURCH     3,374,999
SLAG-GRANULATING APPARATUS
Filed Dec. 17, 1964     3 Sheets-Sheet 3
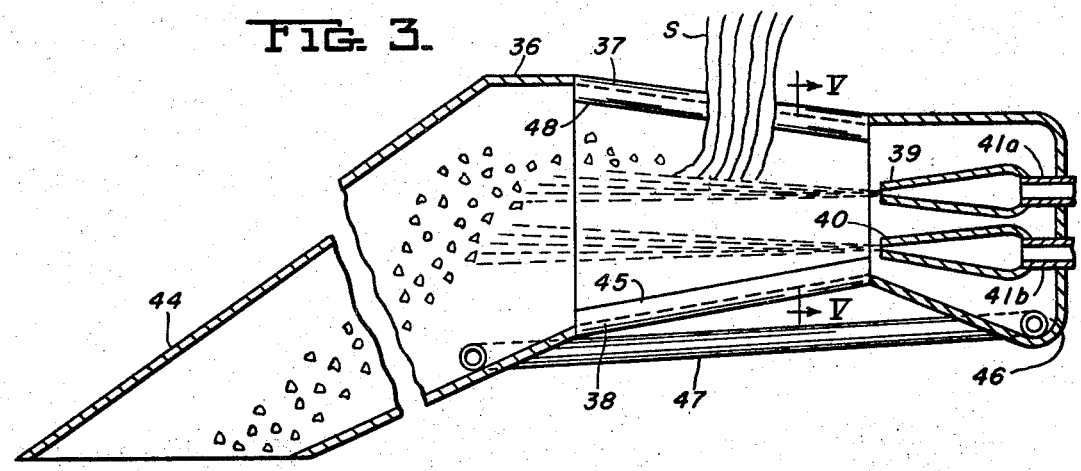
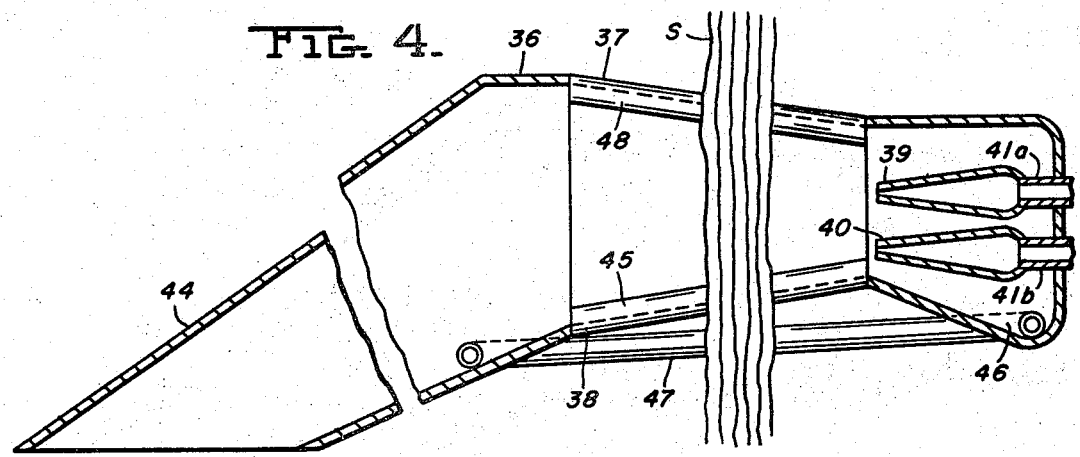
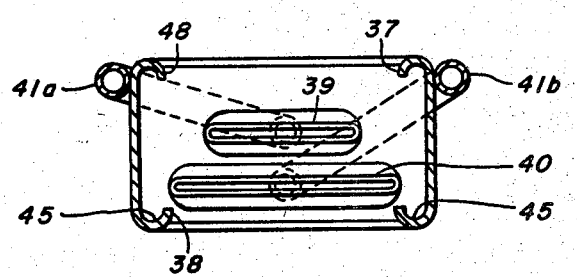
INVENTOR.
CHARLES J. BURCH
By Donald G. Dalton
Attorney United States Patent Office 3,374,999
Patented Mar. 26, 1968

3,374,999
SLAG-GRANULATING APPARATUS
Charles J. Burch, Lower Makefield Township, Bucks County, Pa., assignor to United States Steel Corporation, a corporation of Delaware
Filed Dec. 17, 1964, Ser. No. 418,966
12 Claims. (Cl. 266—24)

ABSTRACT OF THE DISCLOSURE

An apparatus for granulating slag from an open hearth furnace. Slag from the charging side of the furnace falls freely through a shell where water jets strike it and drive it into a surge tank. Slag from the tapping side travels through a runner beneath the furnace to the tank after water jets act on it.

This invention relates to improved apparatus for granulating slag taken from an open hearth steelmaking furnace.

When steel is made in an open hearth furnace, "run-off slag" is taken from the furnace soon after the charge is melted down and "hot metal" introduced to the furnace. Modern practice is to flush this slag from the front or charging side of the furnace. Later, when steel is tapped from the furnace, the rest of the slag overflows the ladle at the rear or tapping side. Blast furnace slag frequently is treated with water jets while still molten to granulate it, but usually such treatment is not applied to open hearth slag because of the hazards involved.

An object of my invention is to provide improved apparatus for granulating slag taken from either side of an open hearth furnace by applying water jets thereto, but avoiding hazards previously encountered.

A further object is to provide improved granulating apparatus which allows front flush slag to remain in free fall out of contact with the surface of a runner or the like until contacted by water jets.

A further object is to provide improved granulating apparatus which does not interfere with handling of slag by conventional procedures whenever the apparatus is out of service.

In the drawings:

FIGURE 3 is a longitudinal vertical section of the granulator for front flush slag on a larger scale on line III—III of FIGURE 1;

FIGURE 4 is a view similar to FIGURE 3, but showing the path the slag takes in the event the water jets do not operate; and FIGURE 5 is a vertical cross section on line V—V of FIGURE 3;

Figure 1:
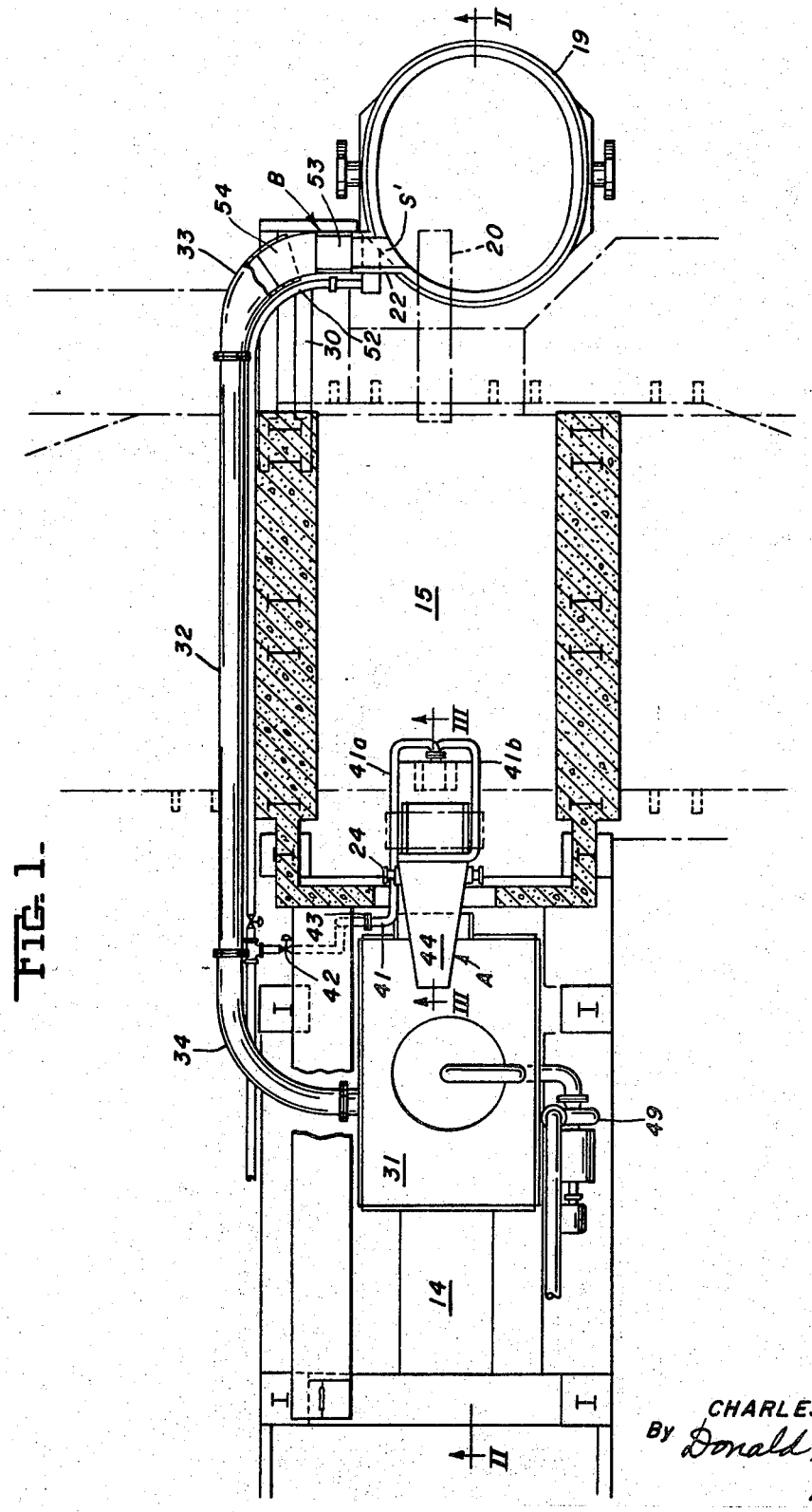
FIGURE 1 is a top plan view, partly in section, of the structure beneath an open hearth furnace equipped with my improved granulating apparatus.
Figure 2:
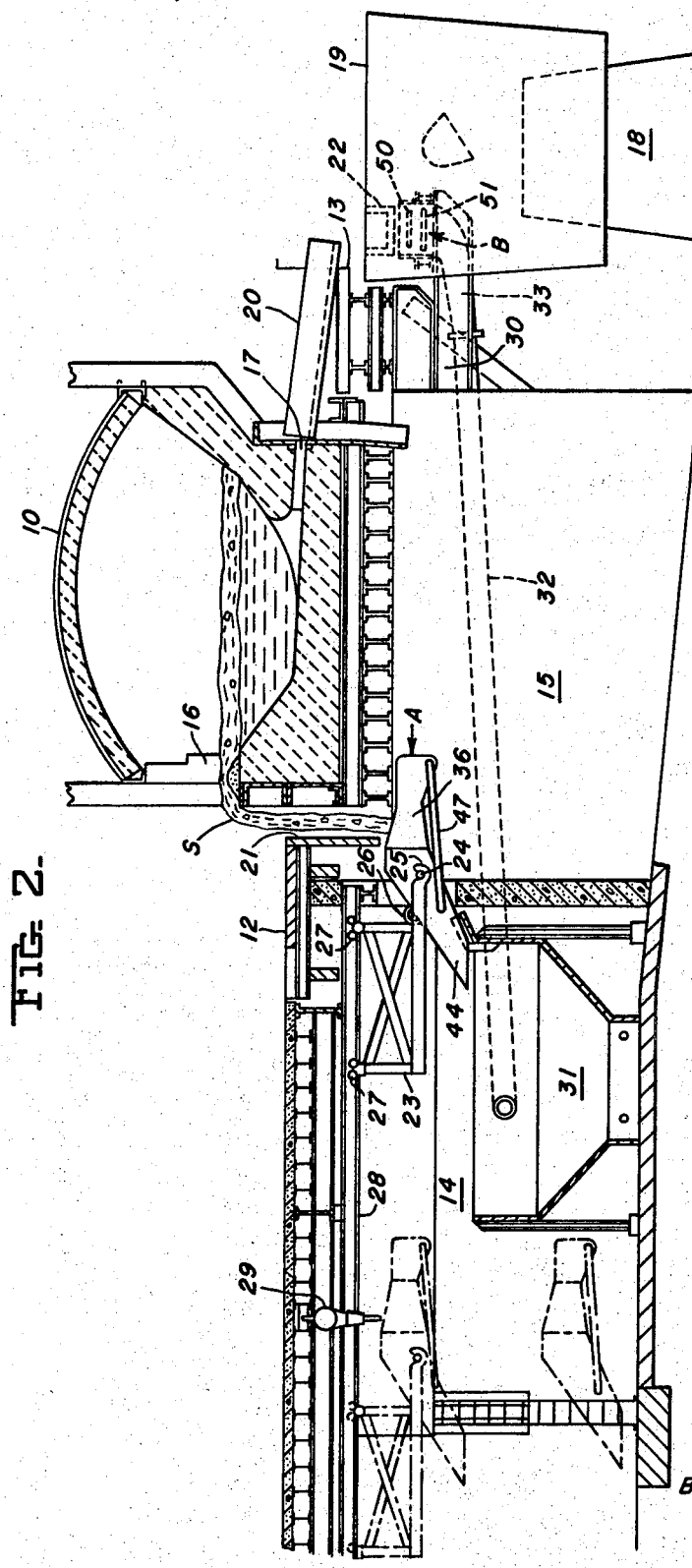
FIGURE 2 is a vertical section on line II—II of FIGURE 1 and showing the furnace itself.

FIGURES 1 and 2 show an open hearth furnace installation which is conventional apart from my granulating apparatus. The installation includes a furnace 10, a charging floor 172 in front of the furnace and a tapping platform 13 in back. The usual kitchen 14 and pit 15 are situated beneath the charging floor and furnace. The furnace has a charging door 16 at the front and a tap hole 17 at the back. The pit contains a ladle stand 18 which supports a ladle 19. A runner 20 extends from the tap hole 17 across the tapping platform 13 and over the edge of the ladle 19. The charging floor 12 has an opening 21 immediately in front of the charging door 16 through which molten run-off slag S passes in free fall as it is flushed from the front of the furnace. The rest of the slag S' discharges through the tap hole 17 and runner 20 into the ladle 19, which has a slag spout 22.

My granulating apparatus includes a first granulator A for the front flush slag S and a second granulator B for the tap slag S'. A frame 23 supports the first granulator A beneath the opening 21 in the charging floor 12. The granulator has studs 24 which project from its side walls and removably engage hooks 25 at the back of the frame. A locking device 26 holds the granulator in place on the frame. A trolley 27 suspends the frame from two parallel overhead rails 28, only one of which is shown. When I wish to remove the granulator, I move the frame to the left away from the furnace. I can then lower the granulator to the floor of the kitchen 14, using a hoist 29 located between rails 28. A frame 30 supports the second granulator B alongside the ladle stand 18 beneath the slag spout 22 of the ladle 19. Frame 30 is fixed to the underside of the tapping platform 13. I use the pit crane or furnace jib crane (not shown) to position or remove the granulator B. Both granulators A and B discharge slag to a surge tank 31 in the kitchen 14. For this purpose a conduit 32 extends from the granulator B underneath the furnace 10 to the surge tank. The conduit has a flared elbow section 33 removably receiving the granulator, and another elbow section 34 connected to the surge tank.

As FIGURES 3, 4 and 5 show, the granulator A includes a metal shell 36, the intermediate portion of which has openings 37 and 38 at the top and bottom respectively aligned with the opening 21 in the floor 12. The rear portion of the shell contains upper and lower water nozzles 39 and 40, the outlets of which are narrow in the vertical direction and wide in the horizontal direction to produce thin sheet-like jets. The outlet of the lower nozzle is approximately twice the width of the upper nozzle. I supply water to the nozzles via a pipe 41, which has branches 41a and 41b leading to the upper and lower nozzles respectively. The pipe contains a remote-controlled valve 42 and a flanged coupling 43, the sections of which I can disconnect to remove the granulator (FIGURE 1). The front portion of shell 36 opposite the nozzles forms a downwardly sloping spout 44 which extends over the edge of the surge tank 31. The inside bottom edges of the shell along the opening 38 curve inwardly to form downwardly sloping gutters 45 which lead to the spout 44. The back portion of the shell beneath the nozzles 39 and 40 forms a catch basin 46. A pipe 47 extends from the catch basin to the spout 44. The inside upper edges of the shell along the opening 37 also curve inwardly to form splash guards 48.

In operation, molten slag S discharges from furnace 10 through door 16 and passes through the opening 21 in the charging floor 12. The slag enters the granulator shell 36 through opening 37. I open the remote-controlled valve 42 to direct water jets through nozzles 39 and 40 horizontally against the molten stream of slag. The jets hit the slag while it is still in free fall and drive it into the spout 44. The slag solidifies in granulated form and collects in the surge tank 31. A pump 49 withdraws water and a mixture of water and granulated slag from the surge tank and transmits them to a slag disposal area outside the open hearth. In the event that the water jets do not operate, the slag stream falls freely through the opening 38 in the bottom of shell 36 and collects in pit 15, from which I can remove it, as is done in conventional practice. It is necessary to exclude water from falling on the pit floor. If molten slag contacts a wet floor, an explosion is likely to occur. The gutters 45, catch basin 46 and splash guards 48 assure that any leakage from the lower jet flows into spout 44, rather than falling into the pit. The wider lower jet catches any leakage from the more narrow upper jet.

The granulator B includes a shell and upper and lower nozzles 50 and 51, which have a water connection 52. The top of the granulator shell has an opening 53 which is immediately below the slag spout 22 of the ladle 19 when the ladle is positioned on the ladle stand 18 to receive molten steel and tap slag S'. The nozzles 50 and 51 are arranged like nozzles 39 and 40 behind the slag stream, whereby they direct jets of water horizontally against the molten slag while it is still in free fall. The portion of the shell opposite the nozzles forms a downwardly sloping spout 54 which extends into elbow 33. The jets drive the slag horizontally into the spout and thence through the conduit 32 to surge tank 31.

From the foregoing description it is seen that my invention affords simple apparatus for granulating slag taken from either side of an open hearth furnace. The apparatus enables water jets to hit the slag while it is in free fall, thus avoiding the use of slag runners which wear rapidly. At the same time, the apparatus can be taken out of service and not interfere with handling the slag by conventional practice.

While I have shown and described only a single embodiment of my invention, it is apparent that modifications may arise. Therefore, I do not wish to be limited to the disclosure set forth but only by the scope of the appended claims.

I claim:

1. In an open hearth furnace installation which includes a furnace, a charging floor extending in front of said furnace, a kitchen and a pit beneath said floor and furnace, and a ladle stand in said pit at the rear of said furnace adapted to support a ladle in a position to receive material tapped from the furnace, said floor having an opening immediately in front of said furnace allowing molten slag flushed from the front of the furnace to pass in free fall, the combination therewith of granulating apparatus comprising a first granulator supported under said opening to receive slag which passes through the opening, a second granulator supported alongside said ladle stand to receive slag which overflows the ladle, each of said granulators including a respective shell and nozzles mounted in said shell for directing jets of water against the molten slag while it remains in free fall through the shell and driving the slag horizontally, said shells having spouts opposite said nozzles for receiving water and slag driven thereby, and means in said kitchen for receiving material from said spouts.

2. A combination as defined in claim 1 in which each of said granulators includes an upper nozzle and a lower nozzle, said nozzles being narrow in the vertical direction and wide in the horizontal direction to produce thin sheet-like jets, said lower nozzles being wider than said upper nozzles.

3. A combination as defined in claim 1 in which said receiving means is a surge tank and the spout of said first granulator extends over said surge tank, said combination also including a conduit extending under said furnace and having a first elbow section receiving the spout of said second granulator and a second elbow section connected with said surge tank.

4. A slag granulator comprising a metal shell having vertically aligned openings at the top and bottom, said opening being substantially of the same size and shape, the opening at the top being adapted to receive a stream of molten slag in free fall, nozzles mounted in said shell for directing water jets horizontally against the slag stream and driving the slag horizontally, said shell having a portion forming a spout opposite said nozzles for receiving water and slag driven thereby, the opening at the bottom being adapted to allow slag to fall freely through the shell in the event the jets fail to operate, and means in said shell for conducting leakage from the jets to said spout.

5. A granulator as defined in claim 4 in which said nozzles include an upper nozzle and a lower nozzle, each of said nozzles having an outlet which is narrow in the vertical direction and wide in the horizontal direction to produce thin sheet-like jets, the outlet of the lower nozzle being substantially wider than the outlet from the upper nozzle enabling the jet from the lower nozzle to catch leakage from the jet from the upper nozzle.

6. A granulator as defined in claim 5 in which the means for conducting leakage includes a catch basin formed in said shell under said nozzles, a pipe connecting said catch basin and said spout, gutters formed in said shell along the edges of the opening in the bottom and communicating with said spout, and splash guards formed in said shell along the edges of the opening in the top.

7. In an open hearth furnace installation which includes a furnace, a charging floor extending in front of said furnace, and a kitchen and a pit beneath said floor and furnace, said floor having an opening immediately in front of said furnace allowing molten slag flushed from the front of the furnace to pass in free fall, the combination therewith of a granulator comprising a metal shell, means supporting said shell underneath said floor, said shell having openings at the top and bottom aligned with the opening in said floor to allow the freely falling slag stream to enter the shell, nozzles mounted in said shell for directing water jets horizontally against the slag stream and driving the slag horizontally, said shell having a portion forming a spout opposite said nozzles for receiving water and slag driven thereby, and a surge tank in said kitchen positioned to receive water and slag from said spout, the opening in the bottom being adapted to allow slag to fall freely through the shell in the event the jets fail to operate.

8. A combination as defined in claim 7 in which said supporting means includes overhead rails on the underside of said floor, a frame supported for horizontal movement on said rails, and means suspending said shell from said rails.

9. A combination as defined in claim 7 further comprising means in said shell for conducting leakage from the jets to said spout.

10. A granulator as defined in claim 9 in which the means for conducting leakage includes a catch basin formed in said shell under said nozzles, a pipe connecting said catch basin and said spout, gutters formed in said shell along the edges of the opening in the bottom and communicating with said spout, and splash guards formed in said shell along the edges of the opening in the top.

11. In an open hearth furnace installation which includes a furnace, a charging floor extending in front of said furnace, a kitchen and a pit beneath said floor and furnace, and a ladle stand in said pit at the rear of said furnace adapted to support a ladle in a position to receive material tapped from said furnace, the combination therewith of a granulator comprising a metal shell, means supporting said shell alongside said ladle stand, said shell having an opening at the top to receive a stream of molten slag in free fall as it overflows the ladle, nozzles mounted in said shell for directing water jets horizontally against the slag stream and driving the slag horizontally, said shell having a portion forming a spout opposite said nozzles for receiving water and slag driven thereby, a surge tank in said kitchen, and means extending under said furnace for conducting material from said spout to said surge tank.

12. A combination as defined in claim 11 in which said last-named means includes a conduit having a first elbow section receiving said spout and a second elbow section connected with said surge tank.

References Cited

UNITED STATES PATENTS

| | | | |
|---|---|---|---|
| 1,886,285 | 11/1932 | Martin | 266—38 |
| 2,605,501 | 8/1952 | Wheeler | 65—141 X |
| 3,081,163 | 3/1963 | Kuzell et al. | 75—30 X |
| 3,171,736 | 3/1965 | Debenham | 266—38 X |
| 3,279,905 | 10/1966 | Wood et al. | 5—141 X |

FOREIGN PATENTS 620,170  4/1927  France.

J. SPENCER OVERHOLSER, *Primary Examiner.*

E. MAR, *Assistant Examiner.*